United States Patent [19]

Pilc et al.

[11] 3,883,691

[45] May 13, 1975

[54] JUNCTION UNIT ALTERNATIVELY PROVIDING BRANCH LINE BROADCASTING AND EXCLUSIVE TWO-BRANCH INTERCONNECTION

[75] Inventors: Randolph John Pilc, Holmdel; Gabriel Gary Schlanger, West Orange, both of N.J.

[73] Assignee: Bell Telephone Laboratories, Incorporated, Murray Hill, N.J.

[22] Filed: Dec. 21, 1973

[21] Appl. No.: 427,318

[52] U.S. Cl. .................. 178/73; 178/69 G; 340/151
[51] Int. Cl. .......................... H04h 9/00; H041 25/20
[58] Field of Search .................. 178/73, 69 R, 69 G; 325/31; 340/151, 168 R, 147 R, 163

[56] References Cited

UNITED STATES PATENTS

| | | | |
|---|---|---|---|
| 2,972,017 | 2/1961 | Davey | 178/73 |
| 3,002,053 | 9/1961 | Gilman et al. | 178/73 |
| 3,040,131 | 6/1962 | Bruder | 178/73 |
| 3,331,923 | 7/1967 | Neiswinter et al. | 178/69 G |
| 3,435,142 | 3/1969 | Crowson et al. | 178/73 |
| 3,786,424 | 1/1974 | McVoy et al. | 340/151 |

*Primary Examiner*—Thomas A. Robinson
*Attorney, Agent, or Firm*—Roy C. Lipton

[57] ABSTRACT

A synchronous multipoint data network is formed by symmetrical junction units. Each junction unit provides signal paths that interconnect two-way branch lines which extend to station line loops or are connected to branch lines of other junction units. Data signals from any branch are broadcast by the junction unit to all other branches. If data signals are simultaneously received from two branches, an exclusive two-way connection is formed therebetween and the interconnections to the nonactive branches are severed. The junction unit also generates "idle" control words and sends them to nonactive branches when an exclusive interconnection is formed.

15 Claims, 4 Drawing Figures

JUNCTION UNIT ALTERNATIVELY PROVIDING BRANCH LINE BROADCASTING AND EXCLUSIVE TWO-BRANCH INTERCONNECTION

FIELD OF THE INVENTION

This invention relates to data communication networks and, more particularly, to network hubs or junctions which interconnect branch lines.

DESCRIPTION OF THE PRIOR ART

A private line data network shared, in parallel, by a plurality of line stations is known as a multipoint or party line. Each station has the capability of sending and receiving data over a line loop extending to a central office of the common carrier. At the central office, the line loop is connected to a branch line which is interconnected with other similar branch lines by a hub or junction unit. Each of these other branch lines may be connected to another station or may extend to another junction unit in the same or in another central office. The multipoint line is formed by all of the branch lines coupled to the interconnected hubs.

In one type of multipoint line, each line station communicates with all of the other line stations. This latter type of multipoint line requires a "symmetrical" junction unit which interconnects each branch with all of the other branches. Incoming data from any branch is broadcast to all of the other branches, subject to the condition that a branch station can receive broadcasted data from only one other branch at a time.

In the application of L. M. Kolensky-R. J. Pilc-W. R. Schaefer-A. H. Willand, Ser. No. 426,333, filed Dec. 19, 1973, there is disclosed a multipoint network provided with symmetrical junction units, each junction unit having the capability of broadcasting data from any branch to all of the other branches. This network is incorporated into a synchronous data system wherein each branch line conveys, in each direction, a data word designating message text information or a control word designating supervisory information (such as idle or busy branch conditions), each word being aligned with words on other branches. If two of the stations desire to intercommunicate, they simply broadcast to the network, each station receiving from the other. The branches of the remaining stations, however, receive garbled signals, resulting from the combined data from the two stations. Moreover, any of these remaining stations can interrupt the two-station conversation by sending data, which then garbles the signals on the two branches. Each junction unit in the network is provided with switching apparatus to form an exclusive two-way connection between a predesignated branch, called a main line, and one of the other branch lines. Equipment on the main line sends branch selection signals to the junction unit switching apparatus to connect the selected branch to the main line and to exclude the unselected branches; exclusion being provided by disconnecting the outgoing path to the excluded branch so that it does not receive garbled data and blocking incoming signals from the excluded branch so that it cannot interrupt the two-way conversation. If the main line is calling a branch of another junction unit, the branch line extending to this other unit (or extending to an intermediate junction unit which, in turn, is connected to this other junction unit) is first selected and the process is again repeated for the other junction unit to select the called branch.

In the L. M. Kolensky et al. application, ony the main branch operator can form the exclusive connection. It is also necessary for the main line operator to know the identity of the branch or branches forming the route of the interconnection and, with this knowledge, to provide the multistep selection procedure or process described above.

It is an object of this invention to form an exclusive two-way connection between any two branches.

It is a further object of this invention to eliminate the branch selection procedure requiring knowledge of the route.

SUMMARY OF THE INVENTION

In accordance with the objects of this invention, the junction unit detects when data (or data words) are concurrently received from two of the branches and severs the interconnections with the other branches. More specifically, when data words (as opposed to "idle" control words) are received from a branch, the junction unit designates the branch as active (and the data is broadcast to all the other branches) and, when two branch lines become active concurrently, the passage of data signals from the junction unit to the nonactive branch lines is precluded and incoming signals from the nonactive branch lines are blocked. An exclusive two-way connection between the active branches is thereby formed by one station sending data and a called station responding.

It is a feature of this invention that, when an exclusive two-way connection is formed, a nonactive branch cannot become designated as active even though incoming data words may be received from the branch.

It is another feature of this invention that, when an exclusive two-way connection is formed, control words, designating the absence of data signals, are applied to the nonactive branches. The control words are also applied to a branch when the branch is idle or broadcasting and all of the other branches are nonactive or idle.

The foregoing and other objects and features of this invention will be more fully understood from the following description of an illustrative embodiment thereof taken in conjunction with the accompanying drawings.

DETAILED DESCRIPTION

Figure 1:
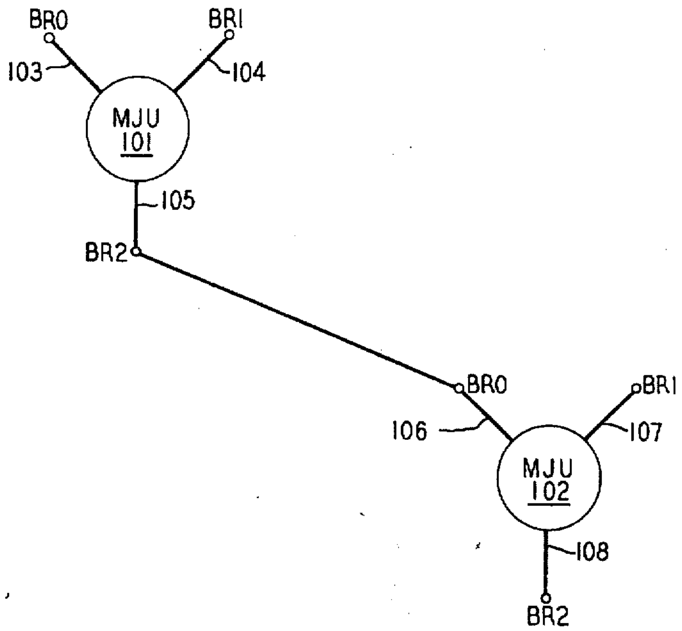
FIG. 1 shows, in schematic form, a multipoint network of branch lines coupled to interconnected symmetrical junction units.

A portion of a synchronous multipoint communication network is shown in FIG. 1 and principally comprises symmetrical multipoint junction units 101 and 102. Multipoint junction unit 101 terminates three branches (BRO, BR1 and BR2), identified by lines 103, 104 and 105. Each of the branches accommodates 2-way, or full-duplex, line signaling. Similarly, multipoint junction unit 102 terminates three branches, identified as lines 106 through 108, with line 106 being connected to line 105 of multipoint junction unit 101. The others of the branches of the multipoint junction units may extend to other junction units; to remote signaling stations (via line loops) arranged to send and receive synchronous data; or to other signaling equipment similarly arranged to send and receive data. It is to be noted that the junction units, including the two shown in FIG. 1, and the signaling equipment may be at separate offices.

Figure 4:
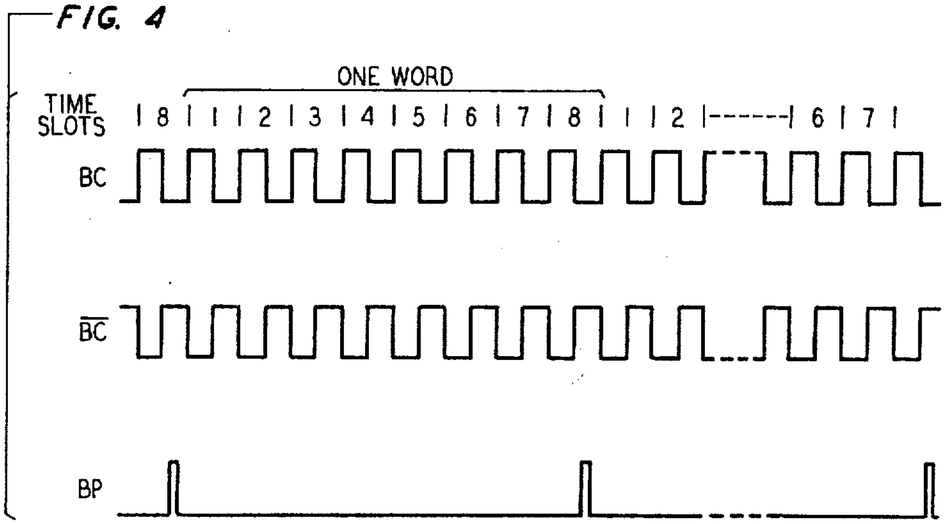
FIG. 4 depicts timing waves produced by clocking equipment shown in FIG. 3.

All of the sending and receiving equipment and circuitry at the remote stations and the multipoint junction units are controlled by a common clock or by synchronized clocks. Transmission is in a word format, each word having eight bits and all of the signaling from whatever source being synchronized so that each bit of a word is in the same time slot as a corresponding bit of a word being transmitted from any other equipment. These time slots are represented in FIG. 4, wherein time slots numbered 1 through 8 designate one word. In accordance with the signaling arrangement, the bit in the eighth time slot interval determines whether the word constitutes a data word ("1" bit), which provides message text information, or a control word ("0" bit), which provides housekeeping information. The housekeeping information for the purposes of this disclosure may constitute line signaling conditions, such as an idle condition designating the absence of message text. It is contemplated that each line or branch will always contain a word, data or control, and therefore will always indicate either message test information or an idle condition exists on the branch.

In accordance with this invention, each multipoint junction unit is symmetrically arranged with a plurality of branches. As shown in FIG. 1, each junction unit has three branches. As described in detail hereinafter, however, the multipoint junction unit is arranged in modular form, permitting the addition of additional branches, the number of branches of each unit being unlimited.

Considering one of the junction units, such as multipoint junction unit 101, three conditions may be present. In the first condition, the incoming side of all of the branches are idle; in the second condition, the incoming side of one of the branches is receiving data words while the other branches are idle; and in the third condition, the incoming sides of two of the branches are receiving data words.

The multipoint junction unit is arranged to monitor the conditions on the incoming sides of the several branches and distinguish whether the branch is idle or conveying data words. Under the condition that all of the branches are idle, the multipoint junction unit sends the idle control word to the outgoing sides of all of the branches. If one of the branches sends data, the multipoint junction unit designates that branch as "active", broadcasts the data received from the branch to the outgoing sides of all of the other (nonactive) branches, while sending the idle control word back to the outgoing side of the active branch. If two of the branches send data to the multipoint junction unit, both are designated as active and, as a result of this concurrent designation of the two as active, the multipoint junction unit interchanges the data between the two branches, sending the incoming data from one branch to the outgoing path of the other. At the same time, the multipoint junction unit blocks the incoming signals from the remaining (nonactive) branch (or branches, if there are more than three branches) and this blockage and nonactive status is maintained even in the event that the nonactive branch attempts to become active by providing data words. In addition, the multipoint junction unit sends an idle control word to the outgoing side of the nonactive branch (or branches) and precludes any attempt by the nonactive branch to become active. Accordingly, in summary, when one branch becomes active the multipoint junction unit broadcasts data from that branch to all of the other branches and when two branches concurrently become active the multipoint junction unit forms an exclusive interconnection between the two branches, excluding the nonactive branches.

Figure 2:
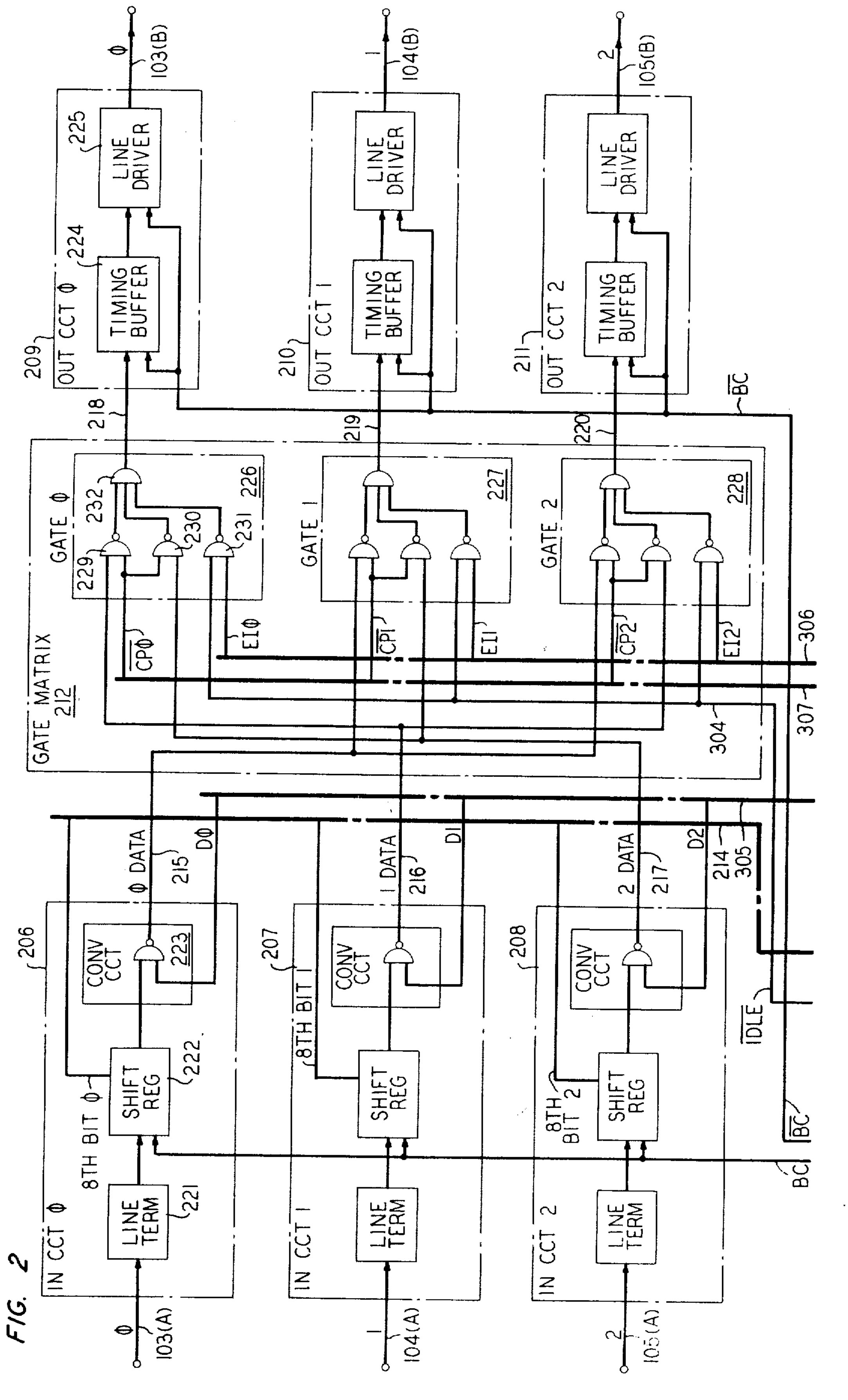
FIGS. 2 and 3, when vertically aligned, disclose, in schematic form, the details of circuitry and equipment of a three-branch symmetrical junction unit arranged in accordance with this invention.
Figure 3:
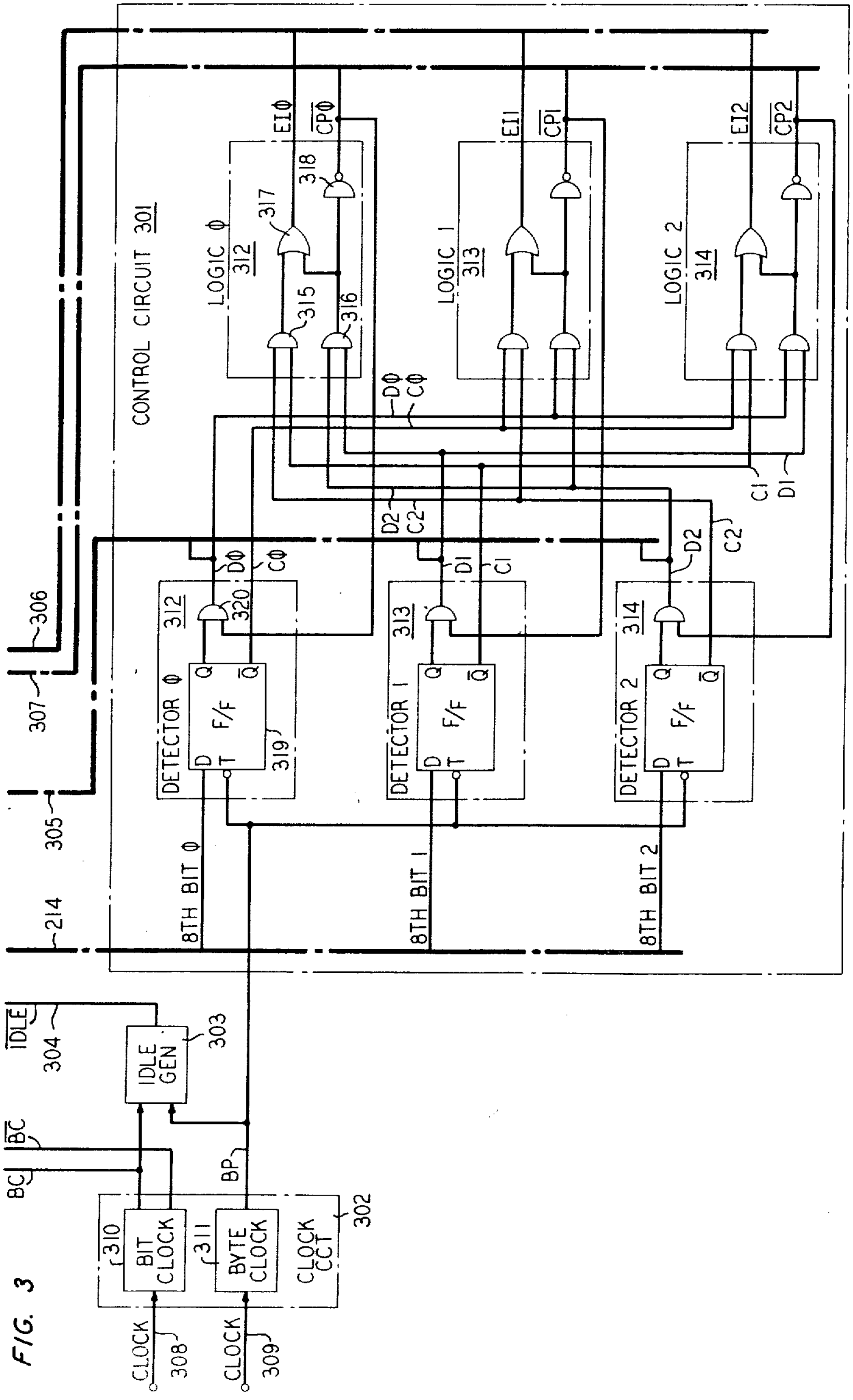

FIGS. 2 and 3 disclose the details of a symmetrical three-branch multipoint junction unit, such as multipoint junction unit 101. The incoming paths 103(A), 104(A) and 105(A) of branches BR0, BR1 and BR2 terminate in incoming circuits 206, 207 and 208, respectively. The outgoing paths 103(B), 104(B) and 105(B) extend from outgoing circuits 209, 210 and 211, respectively. Each of the incoming circuits 206, 207 and 208 regenerates the incoming data under the control of a bit clock pulse on lead BC; monitors the eighth bit of each data word, providing this information to cable 214; blocks or passes the data word in accordance with incoming information on leads D0, D1 and D2 of cable 305; and applies the passed data word via leads 215, 216 and 217 to gate matrix 212.

Gate matrix 212 provides the functions of broadcasting incoming data, interconnecting two branches, and distributing the idle control word to the appropriate outgoing circuits. The incoming data is derived from leads 215, 216 and 217, as previously noted. The idle control word is received on lead 304. Gate matrix 212 is controlled by information on cables 306 and 307 to distribute these words, data and control, to leads 218, 219 and 220, which leads extend to outgoing circuits 209, 210 and 211. Each outgoing circuit, such as outgoing circuit 209, then retimes the data applied thereto under control of bit clock pulses on lead $\overline{BC}$, applying the retimed data to the outgoing paths of the branches.

The clock pulses previously described are provided by clock circuit 302. Clock circuit 302 terminates clock leads 308 and 309 which extend to an office reference clock (not shown), providing the bit clock and byte clock pulses. These pulses are applied to bit clock circuit 310 and byte clock circuit 311 in clock circuit 302. Bit clock circuit 310 regenereates the clock pulses, providing a bit clock pulse represented by timing wave BC in FIG. 4, and passing the bit clock pulse to similarly identified lead BC. Bit clock circuit 310 also generates an inversion of the bit clock pulse represented by timing wave $\overline{BC}$ and applies the wave to lead $\overline{BC}$. Byte clock circuit 311 regenerates the byte clock pulse, and the regenerated byte pulse, represented by timing wave BP in FIG. 4 is passed to lead BP. The bit clock and the byte clock pulses are passed to idle generator 303, which comprises a conventional word generator which repetitively generates the idle word. The generated word is aligned in the appropriate time slots by the bit clock and byte clock pulses and the inversion thereof is passed to lead 304 ($\overline{IDLE}$).

The central control of the multipoint junction unit is provided by control circuit 301. Information from each incoming circuit as to whether the incoming word constitutes a data word or a control word is provided to cable 214, as previously described, and then passed to control circuit 301. Control circuit 301 examines the eighth bit in conjunction with the appearance of the byte clock pulse on lead BP to detect whether the incoming branch is receiving a data word or a control word.

In the event that the eighth bit is a 1 bit (the branch is receiving a data word), and, further, in the event that the junction unit has not been seized by two other active branches, the control circuit designates the incoming branch as active, applying this information back to the incoming circuit by way of cable 305, thereby permitting the incoming circuit to pass the word to the gate matrix. If the branch is the only branch that is active, control circuit 301 applies appropriate information to cables 306 and 307 to instruct gate matrix 212 to broadcast the data to all of the other branches and to pass the idle word on lead 304 to the outgoing circuit of the active branch.

If a second branch becomes active, control circuit 301 recognizes that two branches are concurrently active and passes appropriate signals through leads in cable 305, permitting the two active branches to pass the incoming data words through their incoming circuits to gate matrix 212. Control circuit 301 instructs gate matrix 212 by way of leads in cables 306 and 307 to interconnect the incoming circuit of each active branch with the outgoing circuit of the other active branch while passing the idle word on lead 304 to the outgoing circuit of the inactive branch. At the same time, control circuit 301 provides information by way of cable 305 to the incoming circuit of the inactive branch, which instructs the incoming circuit to block incoming data. Internally, control circuit 301 precludes designation of the inactive branch as active even though a data word may be received, an indication thereof being passed to the control circuit. Finally, if all of the incoming branches are idle, control circuit 301 blocks each incoming circuit and instructs gate matrix 212 to pass the generated idle control word on lead 304 to all of the outgoing circuits.

The multipoint junction unit may be modified to terminate any number of branches. This may be arranged by adding an incoming circuit and an outgoing circuit for each additional branch and interconnecting the incoming and outgoing circuits with the gate matrix 212 and control circuit 301. Gate matrix 212 and control circuit 301 would also be modified in a manner which will become clear hereinafter in view of the detailed description of the gate matrix and the control circuit.

The circuit components for incoming circuit 206 comprise line terminator 221, shift register 222 and converter 223. Incoming circuits 207 and 208 are arranged and operate in substantially the same manner as incoming circuit 206.

The 8-bit data bytes from branch BR0 which are received on incoming path 103(A) are applied to line terminator 221. Line terminator 221 converts these incoming line signals to data bits and serially applies them to shift register 222.

Shift register 222 has a plurality of stages, sufficient in number to store the eight bit of a byte. The incoming data bit stream is shifted in and through the several stages of the shift register in response to bit clock pulses derived from lead BC. The serial output of the last stage of the shift register is passed to converter 223. The condition of the first stage of the shift register is at the same time passed by way of a lead designated $8^{th}$-bit to cable 214 and then to control circuit 301, as previously described. As further described hereinafter, the condition of this lead is examined by control circuit 301 during the eighth bit interval, at which time all of the bits of the incoming data word are stored in the shift register. Therefore, since the condition of the first stage of the shift register is being examined in the eighth bit interval, it can be said that the eighth bit of the data byte is being passed from the shift register through cable 214 to control circuit 301.

It is a function of converter circuit 223 to pass the serial output of shift register 222 to output lead 215 when the port is designated as active; (that is, when incoming data words are received from branch BR0 and the branch is not excluded by reason of the formation of an exclusive interconnection between other branches). This active designation is provided to cable 305 by control circuit 301, as previously noted, and is indicated by a high condition on lead DO. As seen in FIG. 2, converter circuit 223 essentially consists of a gate circuit which will gate the output bit stream of shift register 222 therethrough when a high condition is applied to lead DO. Alternatively, converter circuit 223 blocks the output bit stream of shift register 222 when the port is nonactive. This nonactive designation comprises a low potential applied to lead DO which blocks the gate in converter 223.

Outgoing circuit 209 comprises timing buffer 224 and line driver 225. Outgoing circuits 210 and 211 are arranged and operate in substantially the same manner as outgoing circuit 209. Timing buffer 224 normally functions to retime and realign the serial bit stream derived from gate matrix 212 by way of lead 218. The retiming and realigning is under the control of the bit clock pulses on lead $\overline{BC}$. More specifically, the timing buffer provides a delay which, when added to the delays of any one of the shift registers, re-establishes the correct phase of each data byte. The output bit stream of timing buffer 224 is passed to line driver 225. The line driver retimes each bit under the control of the clock pulses on lead $\overline{BC}$ and repeats the bit to outgoing path 103(B) of branch BR0.

Control circuit 301 comprises a plurality of detector circuits and a corresponding plurality of logic circuits; one detector circuit and a corresponding logic circuit for each two-way branch. In control circuit 301 the detector circuits are identified as detector circuits 312 through 314 and are individually associated with branches BR0 through BR2, respectively. Each detector circuit operates and is arranged in substantially the same manner. The detector circuit examines the eighth bit of the incoming byte together with information derived from its associated logic circuit to determine whether the port of the branch is to be designated as active. Detector circuit 312 includes flip-flop 319 and gate 320. The D input terminal of flip-flop 319 is connected via cable 214 to the first stage of shift register 222 in incoming circuit 206. The flip-flop is toggled by the byte clock pulse on lead BP. Accordingly, if a data byte is being received, a 1 bit is in the first stage of the shift register when the byte clock pulse is applied to the TOGGLE input and flip-flop 319 is toggled to the SET condition. Conversely, a 0 in the first stage, indicating an incoming control byte, results in the absence of the application of a 1 bit to flip-flop 319 and the byte clock pulse toggles the flip-flop to the CLEAR condition.

The $\overline{Q}$ output of flip-flop 319 is passed to lead CO. Lead CO therefore is up when the corresponding branch BRO is idle and down when data is being received. The Q output of flip-flop 319 is applied to gate 320. The other input to gate 320 extends to lead $\overline{CPO}$. As described hereinafter, when the port BRO is not excluded (that is, when two other branches do not have an exclusive interconnection), lead $\overline{CPO}$ is high. Accordingly, gate 320 passes the Q output of flip-flop 319 to lead DO when the port is not excluded. Lead DO is thus up in the event that incoming data bytes are being received and the port is not excluded. As previously noted, this designates that the port for branch BRO is active and the incoming circuit converter passes the data. Conversely, if the port is excluded or if the branch is idle, lead DO is down and the incoming data is blocked.

Logic circuit 312 examines the output condition of the detectors other than detector 312 and determines whether the port for branch BRO is excluded or all the other branches are idle. In the event that the port is not excluded, logic circuit 312 provides a high potential to lead $\overline{CPO}$. In the event that the port is excluded or all other branches are idle, logic circuit 312 applies a high condition to lead EIO. Logic circuit 312 consists of AND gates 315 and 316, OR gate 317 and inverter 318. The inputs to AND gate 315 consist of leads C1 and C2. The output of AND gate 315 is therefore up when both of the other branches are idle. AND gate 316 is connected to leads D1 and D2. The output of AND gate 316 is up when both of the other ports are designated as active. In the event that the output of gate 315 is up or the output of gate 316 is up, this high condition is passed through OR gate 317 to lead EIO. In the event that the output of gate 316 is down (the other two ports are not both active), inverter 318 applies a high condition to lead $\overline{CPO}$. Leads EIO and $\overline{CPO}$ are applied by way of cables 306 and 307 to gate matrix 212. Lead $\overline{CPO}$ is also applied to detector 312, as previously noted.

Gate matrix 212 generally comprises gates 226, 227 and 228; each of the three gates individually providing signal path connections to output circuits 209, 210 and 211, respectively, and each of the gates being arranged and operating in substantially the same manner. Inputs to each of the gates are provided by the incoming circuits of all of the other branches and, in addition, by the inverse of the idle word on $\overline{IDLE}$ lead 304. It is the general function of each gate circuit to complete a signal path from one or the other of the incoming circuits of the other branches of from idle generator 303 to its associated outgoing circuit. It is to be noted, therefore, that each incoming circuit is connected to gate circuits associated with all of the other branches while idle generator 303 is connected to all of the gate circuits.

Gate circuit 226 consists of gates 229 through 232. Gates 229 and 230 are connected to output leads 216 and 217 of incoming circuits 207 and 208 and, in addition, gates 229 and 230 are controlled by lead $\overline{CPO}$. Accordingly, these gates will pass the output stream of one or the other of incoming circuits 207 and 208 so long as the BRO port is not excluded (lead $\overline{CPO}$ is high). Thus, assuming port is not excluded and data from one or the other of the two branches is being received, this data is passed through either gate 229 or 230 and then through gate 232 to be passed by way of lead 218 to outgoing circuit 209. If, however, branches BR1 and BR2 are both active, control circuit 301 excludes the port, applying a low potential to lead $\overline{CPO}$, as previously described, thereby blocking gates 229 and 230.

An input of gate 231 is connected by way of lead 304 to the output of idle generator 303. The other input to gate 231 is connected to lead EIO. As described, lead EIO is high when the port is excluded or all of the other branches are idle. In this event, gate 231 is enabled and the idle word generated by generator 303 is passed through the gate and through gate 232 to outgoing circuit 209.

It was previously noted that all of the gate circuits are arranged and operate in substantially the same manner. It is therefore, apparent that when all of the branches are idle, the output of idle generator 303 is applied by all of the gate circuits to their corresponding outgoing circuits. In the event that one of the branches is active and the others are idle, the gate circuit associated with the active branch passes the output of idle generator 303 to its outgoing circuit while the gate circuit of all of the other branches pass the bit stream received from the active branch to their outgoing circuits. Finally, if two of the branches are designated active, their associated gate circuits pass the bit stream received from the other active branch. The gate circuit of the inactive branch, however, severs the signal path connections with these active branches and passes the output of idle generator 303 to its outgoing circuit. It was previously noted that control circuit 301 and gate matrix 212 may be modified to accommodate ports for additional branches. As is now apparent, this may be done by providing a detector and logic circuit in control circuit 301 and a gate circuit in the gate matrix for each additional port. Each logic circuit is then modified by adding gates, such as gate 316, to examine the outputs of detector circuit pairs and by adding an input to gate 315 to examine the output of each additional detector circuit. Each gate circuit is modified by adding a gate, such as gate 229, for each additional incoming circuit. Thus, the junction unit may accommodate an unlimited number of branches.

Although a specific embodiment of this invention has been shown and described, it will be understood that various modifications may be made without departing from the spirit of this invention.

We claim:

1. A junction unit for terminating a plurality of two-way branch lines, the junction unit including signal paths interconnecting an incoming side of each branch line with outgoing sides of all of the other branch lines, Characterized in that the junction unit further includes means responsive to concurrent reception of signals from the incoming sides of two of the branch lines for severing signal paths exclusive of the signal paths interconnecting the two branch lines.

2. A junction unit, in accordance with claim 1, wherein the severing means severs the paths connected to the outgoing sides of the other branch lines.

3. A junction unit, in accordance with claim 2, wherein the severing means severs the paths connected to the incoming sides of the other branch lines.

4. A junction unit, in accordance with claim 1, wherein the severing means severs the paths interconnecting the other branch lines with the two branch lines.

5. A multibranch junction unit having means interconnecting each branch line to all of the other branch lines, the interconnecting means including means for broadcasting signals from each of the branch lines and means for passing the broadcast signals to each of the other branch lines, characterized in that the junction unit further includes means responsive to the signals from each of the branch lines for designating the branch line as active, and means responsive to concurrent active designations of two of the branch lines for severing interconnections exclusive of the interconnections from each of the active branch lines to the other active branch line.

6. A junction unit, in accordance with claim 5, wherein the severing means includes means for blocking the passing means of each of the non-active branch lines.

7. A junction unit, in accordance with claim 5, wherein the severing means includes means for disabling the broadcasting means of each of the non-active branch lines.

8. A junction unit, in accordance with claim 5, wherein the severing means includes means for blocking the passing means and disabling the broadcasting means of each of the non-active branch lines.

9. A junction unit, in accordance with claim 5, and further including means responsive to the severing means for disabling the designating means of each of the non-active branch lines.

10. A junction unit for interconnecting a plurality of two-way branch lines, each of the branch lines conveying data signals to interchange text information and conveying control signals in the absence of the data signals, the junction unit comprising:

means for repeating the data signals received from each of the branch lines;

means for applying the repeated data signals to each of the branch lines;

means responsive to the reception of data signals and control signals from each of the branch lines to designate the condition of the branch line as active and non-active, respectively, and control means for monitoring the designated conditions of the several branch lines, the control means including means responsive to the concurrent designations of two of the branch lines as active for blocking the applying means of non-active branch lines.

11. A junction unit in accordance with claim 10 wherein the control means further includes means responsive to the concurrent designation of two of the branch lines as active for disabling the repeating means of the non-active branch lines.

12. A junction unit in accordance with claim 10 wherein the control means includes means responsive to the designation of two of the branch lines as active for maintaining the non-active designations from each of the non-active branch lines independent of the reception of signals from the branch lines.

13. A junction unit in accordance with claim 12 wherein the repeating means includes means responsive to the designation of the branch line as non-active for precluding the repeating of the received data signal.

14. A junction unit in accordance with claim 10 and further including means for generating the control signals, means for applying the generated control signals to each of the branch lines, and means responsive to the concurrent designation of two of the branch lines as active for enabling the applying means of the non-active branch lines.

15. A junction unit in accordance with claim 14, and further including means responsive to the designation of all of the branch lines as non-active for enabling the applying means of all of the branch lines.

* * * * *